(12) United States Patent
Furbeck

(10) Patent No.: US 8,532,417 B2
(45) Date of Patent: *Sep. 10, 2013

(54) OPTIMIZATION OF IMAGE ENCODING USING PERCEPTUAL WEIGHTING

(71) Applicant: Research in Motion Limited, Waterloo (CA)

(72) Inventor: David Stuart Furbeck, Keller, TX (US)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/669,088

(22) Filed: Nov. 5, 2012

(65) Prior Publication Data

US 2013/0058586 A1   Mar. 7, 2013

Related U.S. Application Data

(63) Continuation of application No. 12/394,144, filed on Feb. 27, 2009, now Pat. No. 8,326,067.

(51) Int. Cl.
*G06K 9/36* (2006.01)

(52) U.S. Cl.
USPC ............................................. 382/250; 382/251

(58) Field of Classification Search
USPC .................. 382/232–233, 250–252, 274–275
See application file for complete search history.

(56) References Cited

U.S. PATENT DOCUMENTS

| | | | |
|---|---|---|---|
| 5,734,755 A | | 3/1998 | Ramchandran et al. |
| 8,326,067 B2 * | | 12/2012 | Furbeck .......................... 382/250 |
| 2003/0179937 A1 | | 9/2003 | Brake et al. |
| 2004/0028131 A1 | | 2/2004 | Ye et al. |
| 2006/0013497 A1 | | 1/2006 | Yang et al. |
| 2008/0298702 A1 | | 12/2008 | Gunupudi et al. |

FOREIGN PATENT DOCUMENTS

| | | |
|---|---|---|
| WO | 2006/005182 | 1/2006 |
| WO | 2007/015126 | 2/2007 |

OTHER PUBLICATIONS

Crouse, Matthew et al.; "Joint Thresholding and Quantizer Selection for Transform Image Coding: Entropy-Constrained Analysis and Applications to Baseline JPEG"; IEEE Transactions on Image Processing; vol. 6, No. 2; Feb. 1997; pp. 285-297.

Hung, Andy C. et al.; "Optimal Quantizer Step Sizes for Transform Coders"; 1991 IEEE; pp. 2621-2624.

Ortega, Antonio et al.; "Optimal Trellis-Based Buffered Compression and Fast Approximations"; IEEE Transactions on Image Processing 3; No. 1; Jan. 1994; pp. 26-39.

Pennebaker, William B. et al.; "JPEG Still Image Data Compression Standard"; Kluwer Academic Publishers Group; 6 pages, Pub. 1993.

(Continued)

*Primary Examiner* — Duy M Dang
(74) *Attorney, Agent, or Firm* — Fish & Richardson P.C.

(57) ABSTRACT

A method, system and computer program product for optimal encoding for an image defined by image data. The quantization table, run-length coding and Huffman codebook are selected to minimize a Lagrangian cost function, wherein the minimization includes iteratively determining the optimal run-size pairs and in-category indices for minimizing a rate-distortion cost function, and wherein the rate-distortion cost function includes a perceptual weighting factor applied to a quantization error. The perceptual weighting factor adjusts the rate-distortion cost function to apply greater weight to lower frequency quantization error than to higher frequency quantization error.

20 Claims, 14 Drawing Sheets

(56) References Cited

OTHER PUBLICATIONS

Ramchandran, Kannan et al.; "Bit Allocation for Dependent Quantization with Applications to Multiresolution and MPEG Video Coders"; IEEE Transactions on Image Processing 3; No. 5; Sep. 1994; pp. 533-545.

Ramchandran, Kannan et al.; "Rate-Distortion Optimal Fast Thresholding with Complete JPEG/MPEG Decoder Compatibility"; IEEE Transactions on Image Processing; vol. 3, No. 5; Sep. 1994; pp. 700-704.

Ratnakar, Viresh et al.; "An Efficient Algorithm for Optimizing DCT Quantization"; IEEE Transactions on Image Processing; vol. 9, No. 2; Feb. 2002; pp. 267-270.

Ratnakar, Viresh et al.; "RD-OPT: An Efficient Algorithm for Optimizing DCT Quantization Tables"; 1995 IEEE; pp. 332-341.

Wallace, Gregory K.; "The JPEG Still Picture Compression Standard"; Communications of the ACM; vol. 34, No. 4; Apr. 1991; pp. 30-44.

Westen, S.J. et al.; "Preceptual Optimization of Image Coding Algorithms"; Proceedings of the International Conference on Image Processing (ICIP); IEEE Comp. Soc. Press; vol. 2; Oct. 1995.

Wu, S. et al.; "Rate Constrained Picture-Adaptive Quantization for JPEG Baseline Coders"; 1993 IEEE; pp. V-389-V392.

Yang, E. et al.; "Fixed-Slope Universal Lossy Data Compression"; IEEE Transactions on Information Theory; vol. 43, No. 5; Sep. 1997; pp. 1465-1476.

Yang, E. et al.; "Joint Optimization of Run-Length Coding, Huffman Coding and Quantization Table with Complete Baseline JPEG Compatibility"; 2007 IEEE; pp. 181-184.

Yang, E. et al.; "Variable-Rate Trellis Source Encoding"; IEEE Transactions on Information Theory; vol. 45, No. 2; Mar. 1999; pp. 586-608.

Office Action issued in Canadian Application No. 2,693,988 on Feb. 10, 2012; 3 pages.

* cited by examiner

Notations:

$C_{i,j}$ - the $i^{th}$ DCT coefficient ($1 \leq i \leq 63$) of block $j$;

c_abs(i) - absolute value of $C_{i,j}$;

$q_i$ - the current quantization step size for the $i^{th}$ DCT coefficient in zigzag order;

s_min(s) - the minimum absolute number in size group s ($1 \leq s \leq 10$);

s_max(s) - the maximum absolute number in size group s ($1 \leq s \leq 10$);

dist(r, i) - mean square distortion of dropping all the coefficients between state $i$-$r$-$1$ and state $i$, i.e., $dist(r, i) = \sum_{k=i-r}^{i-1} C^2_{k,j}$;

ent(r, s) - entropy rate associated with the pair (r, s), i.e., $ent(r,s) = -\log_2 P(r,s) + s$;

d(i, s) - mean square distortion resulting from $C_{i,j}$ when the corresponding index is forced into size group s;

ID(i, s) - index to be sent for $C_{i,j}$ when the index is in size group s;

state(i).r - the *run* part of the last *(r, s)* pair on the optimal path to state *i*;

state(i).s - the *size* part of the last *(r, s)* pair on the optimal path to state *i*;

state(i).ID - index to be sent for $C_{i,j}$;

state(i).cost - the minimum Lagrangian cost to state *i*;

eob_cost(i) - the cost of dropping the coefficients after state *i*, i.e., $eob\_cost(i) = \sum_{k=i+1}^{63} C^2_{k,j} + \lambda \cdot ent(0,0)$;

$j^*(i)$ - the minimum cost of a full path where the $i^{th}$ index is the last nonzero index.

FIG. 6a

Initialization:

Pre-calculate ent(r, s) based on $P_0$ and set the state 0 appropriately (we do not optimize DC coefficient in this procedure).

For each 8X8 block, pre-calculate dist(r, i) and eob_cost(i) recursively.

Procedure (find the optimal run-size pairs and in-category indices for one block):

/* step 1 : find the distortion and in-category index if $C_{i,j}$ is forced to size group s */ for each state i (1 ≤ i ≤ 63)

$ind = C_{i,j} // q_i$      /* "//" stands for division with rounding */ s = size_group(ind)      /* size_group() is used to find the size group of ind */

$d(i,s) = (C_{i,j} - ind^* q_i)^2$

ID(i, s) = ind for 1 ≤ size ≤ s-1

$d(i,size) = (c\_abs(i) - s\_max(size)^* q_i)^2;$

ID(i, size) = ($C_{i,j}$ < 0) ? (-s_max(size)) : s_max(size);

for s + 1 ≤ size ≤ 10

$d(i,size) = (c\_abs(i) - s\_min(size)^* q_i)^2;$

ID(i, size) = ($C_{i,j}$ < 0) ? (-s_min(size)) : s_min(size);

FIG. 6b

/* step 2 : find the optimal path where the $i^{th}$ index is the last nonzero index to be sent */
for each state $i$ ($1 \leq i \leq 63$)
    current_minicost = a large number
    for each state i-r-1 ($0 \leq r \leq i - 1$ for i<16, $0 \leq r \leq 15$ for $i \geq 16$)
        for each size group s ($1 \leq s \leq 10$)
            dist_inc = dist(r, i) + d(i, s)
            J = state(i-r-1).cost + dist_inc + $\lambda$*ent(r,s)
            if (J < current_minicost)
                current_minicost = J
                record *r, s, ID(i,s)*, and *current_minicost* to state *i*
    /* consider the special transition *(15,0)* for state *i* ($i \geq 16$) */
    if ( $16 \leq i \leq 62$ ) /* state 63 does not have (15,0) incoming transition */
        dist_inc = dist(15, i) + $C^2_{i,j}$
        J = state(i-16).cost + dist_inc + $\lambda$*ent(15,0)
        if (J < current_minicost)
            current_minicost = J
            record *r, s, 0* and *current_minicost* to state *i*
    /* find the total cost of the full path */
    $J^*(i)$ = state(i).cost + eob_cost(i)
/* step 3 : find the optimal path for current block */
Find the minimum Lagrangian cost by comparing $J^*(i)$ ( $0 < i < 63$ ), then trace back to obtain the optimal run-size pairs and the corresponding indices.

FIG. 6c

OPTIMIZATION OF IMAGE ENCODING USING PERCEPTUAL WEIGHTING

CROSS-REFERENCE TO RELATED APPLICATIONS

The present application is a continuation of U.S. patent application Ser. No. 12/394,144 filed Feb. 27, 2009, and issued as U.S. Pat. No. 8,326,067 on Dec. 4, 2012 and owned in common herewith.

FIELD OF THE APPLICATION

The present application relates generally to the optimal encoding of an image and, in particular, to the joint optimization of run-length coding, Huffman coding, and quantization using perceptual weighting.

BACKGROUND OF THE APPLICATION

JPEG as described in W. Pennebaker and J. Mitchell, "JPEG still image data compression standard," Kluwer Academic Publishers, 1993, (hereinafter "reference [1]"), G. Wallace, "The JPEG still-image compression standard," Commun. ACM, vol. 34, pp. 30-44, April 1991 (hereinafter "reference [2]"), is a popular DCT-based still image compression standard. It has spurred a wide-ranging usage of JPEG format such as on the World-Wide-Web and in digital cameras.

The popularity of the JPEG coding system has motivated the study of JPEG optimization schemes—see for example J. Huang and T. Meng, "Optimal quantizer step sizes for transform coders," in Proc. IEEE Int. Conf. Acoustics, Speech and Signal Processing, pp. 2621-2624, April 1991 (hereinafter "reference [3]"), S. Wu and A. Gersho, "Rate-constrained picture-adaptive quantization for JPEG baseline coders," in Proc. IEEE Int. Conf. Acoustics, Speech and Signal Processing, vol. 5, pp. 389-392, 1993 (hereinafter "reference [4]"), V. Ratnakar and M. Livny, "RD-OPT: An efficient algorithm for optimizing DCT quantization tables", in Proc. Data Compression Conf., pp. 332-341, 1995 (hereinafter "reference [5]") and V. Ratnakar and M. Livny, "An efficient algorithm for optimizing DCT quantization," IEEE Trans. Image Processing, vol. 9 pp. 267-270, February 2000 (hereinafter "reference [6]"), K. Ramchandran and M. Vetterli, "Rate-distortion optimal fast thresholding with complete JPEG/MPEG decoder compatibility," IEEE Trans Image Processing, vol. 3, pp. 700-704, September 1994 (hereinafter "reference [7]"), M. Crouse and K. Ramchandran, "Joint thresholding and quantizer selection for decoder-compatible baseline JPEG," in Proc. IEEE Int. Conf. Acoustics, Speech and Signal Processing, pp. 2331-2334, 1995 (hereinafter "reference [8]") and M. Crouse and K. Ramchandran, "Joint thresholding and quantizer selection for transform image coding: Entropy constrained analysis and applications to baseline JPEG," IEEE Trans. Image Processing, vol. 6, pp. 285-297, February 1997 (hereinafter "reference [9]"). The schemes described in all of these references remain faithful to the JPEG syntax. Since such schemes only optimize the JPEG encoders without changing the standard JPEG decoders, they can not only further reduce the size of JPEG compressed images, but also have the advantage of being easily deployable. This unique feature makes them attractive in applications where the receiving terminals are not sophisticated to support new decoders, such as in wireless communications.

Quantization Table Optimization

JPEG's quantization step sizes largely determine the rate-distortion tradeoff in a JPEG compressed image. However, using the default quantization tables is suboptimal since these tables are image-independent. Therefore, the purpose of any quantization table optimization scheme is to obtain an efficient, image-adaptive quantization table for each image component. The problem of quantization table optimization can be formulated easily as follows. (Without loss of generality we only consider one image component in the following discussion.) Given an input image with a target bit rate $R_{budget}$ one wants to find a set of quantization step sizes $\{Q_k: k=0, \ldots, 63\}$ to minimize the overall distortion $$D = \sum_{n=1}^{Num\_Blk} \sum_{k=0}^{63} D_{n,k}(Q_k) \qquad (1)$$

subject to the bit rate constraint $$R = \sum_{n=1}^{Num\_Blk} R_n(Q_0, \ldots, Q_{63}) \leq R_{budget} \qquad (2)$$

where Num_Blk is the number of blocks, $D_{n,k}(Q_k)$ is the distortion of the $k^{th}$ DCT coefficient in the $n^{th}$ block if it is quantized with the step size $Q_k$, and $R_n(Q_0, \ldots, Q_{63})$ is the number of bits generated in coding the $n^{th}$ block with the quantization table $\{Q_0, \ldots, Q_{63}\}$.

Since JPEG uses zero run-length coding, which combines zero coefficient indices from different frequency bands into one symbol, the bit rate is not simply the sum of bits contributed by coding each individual coefficient index. Therefore, it is difficult to obtain an optimal solution to (1) and (2) with classical bit allocation techniques. Huang and Meng—see reference [3]—proposed a gradient descent technique to solve for a locally optimal solution to the quantization table design problem based on the assumption that the probability distributions of the DCT coefficients are Laplacian. A greedy, steepest-descent optimization scheme was proposed later which makes no assumptions on the probability distribution of the DCT coefficients—see reference [4]. Starting with an initial quantization table of large step sizes, corresponding to low bit rate and high distortion, their algorithm decreases the step size in one entry of the quantization table at a time until a target bit rate is reached. In each iteration, they try to update the quantization table in such a way that the ratio of decrease in distortion to increase in bit rate is maximized over all possible reduced step size values for one entry of the quantization table. Mathematically, their algorithm seeks the values of k and q that solve the problem of achieving the following maximum $$\max_k \max_q \frac{-\Delta D|_{Q_k \to q}}{\Delta R|_{Q_k \to q}} \qquad (3)$$

where $\Delta D|_{Q_k \to q}$ and $\Delta R|_{Q_k \to q}$ are respectively the change in distortion and that in overall bit rate when the $k^{th}$ entry of the quantization table, $Q_k$, is replaced by q. These increments can be calculated by $$\Delta D|_{Q_k \to q} = \sum_{n=1}^{Num\_Blk} [D_{n,k}(q) - D_{n,k}(Q_k)] \qquad (4)$$

and $$\Delta R|_{Q_k \to q} = \qquad (5)$$
$$\sum_{n=1}^{Num\_Blk} [R_n(Q_0, \ldots, q, \ldots, Q_{63}) - R_n(Q_0, \ldots, Q_k, \ldots, Q_{63})]$$

The iteration is repeated until $R_{budge}-R(Q_0, \ldots, Q_{63})| \leq \epsilon$, where $\epsilon$ is the convergence criterion specified by the user.

Both aforementioned algorithms are very computationally expensive. Ratnakar and Livny—see references [5] and [6]—proposed a comparatively efficient algorithm to construct the quantization table based on the DCT coefficient distribution statistics without repeating the entire compression-decompression cycle. They employed a dynamic programming approach to optimizing quantization tables over a wide range of rates and distortions and achieved a similar performance as the scheme in reference [4].

Optimal Thresholding

In JPEG, the same quantization table must be applied to every image block. This is also true even when an image-adaptive quantization table is used. Thus, JPEG quantization lacks local adaptivity, indicating the potential gain remains from exploiting discrepancies between a particular block's characteristics and the average block statistics. This is the motivation for the optimal fast thresholding algorithm of—see reference [7], which drops the coefficient indices that are less significant in the rate-distortion (R-D) sense. Mathematically, it minimizes the distortion, for a fixed quantizer, between the original image X and the thresholded image $\tilde{X}$ given the quantized image $\hat{X}$ subject to a bit budget constraint, i.e., $$\text{find min } [D(X,\tilde{X})|\hat{X}] \text{ subject to } R(\tilde{X}) \leq R_{budget} \qquad (6)$$

An equivalent unconstrained problem is to minimize $$J(\lambda) = D(X,\tilde{X}) + \lambda R(\tilde{X}) \qquad (7)$$

A dynamic programming algorithm is employed to solve the above optimization problem (7) recursively. It calculates $J^*_k$ for each $0 \leq k \leq 63$, and then finds k* that minimizes this $J^*_k$, i.e., finding the best nonzero coefficient to end the scan within each block independently. The reader is referred to reference [7] for details. Since only the less significant coefficient indices can be changed, the optimal fast thresholding algorithm—see reference [7]—does not address the full optimization of the coefficient indices with JPEG decoder compatibility.

Joint Thresholding and Quantizer Selection

Since an adaptive quantizer selection scheme exploits image-wide statistics, while the thresholding algorithm exploits block-level statistics, their operations are nearly "orthogonal". This indicates that it is beneficial to bind them together. The Huffman table is another free parameter left to a JPEG encoder. Therefore, Crouse and Ramchandran—see references [8] and [9]—proposed a joint optimization scheme over these three parameters, i.e., $$\text{find } \min_{T,Q,H} D(T, Q) \text{ subject to } R(T, Q, H) \leq R_{budget} \qquad (8)$$

where Q is the quantization table, H is the Huffman table incorporated, and T is a set of binary thresholding tags that signal whether to threshold a coefficient index. The constrained minimization problem of (8) is converted into an unconstrained problem by the Lagrange multiplier as $$\text{find } \min_{T,Q,H} [J(\lambda) = D(T, Q) + \lambda R(T, Q, H)] \qquad (9)$$

Then, they proposed an algorithm that iteratively chooses each of Q,T,H to minimize the Lagrangian cost (9) given that the other parameters are fixed.

In U.S. patent application Ser. No. 10/924,189, filed Aug. 24, 2004, and entitled "Method, System and Computer Program Product for Optimization of Data Compression", by Yang and Wang, a method was disclosed of jointly optimizing run-length coding, Huffman coding and quantization table with complete baseline JPEG decoder compatibility. The present application describes an improvement to the method described by Yang and Wang.

BRIEF DESCRIPTION OF THE DRAWINGS

A detailed description of the preferred embodiments is provided herein below with reference to the following drawings, in which:

FIGS. 6a, 6b and 6c is pseudo-code illustrating a graph-based optimization method in accordance with an aspect of the invention;

DETAILED DESCRIPTION OF EXAMPLE EMBODIMENTS

Figure 1:
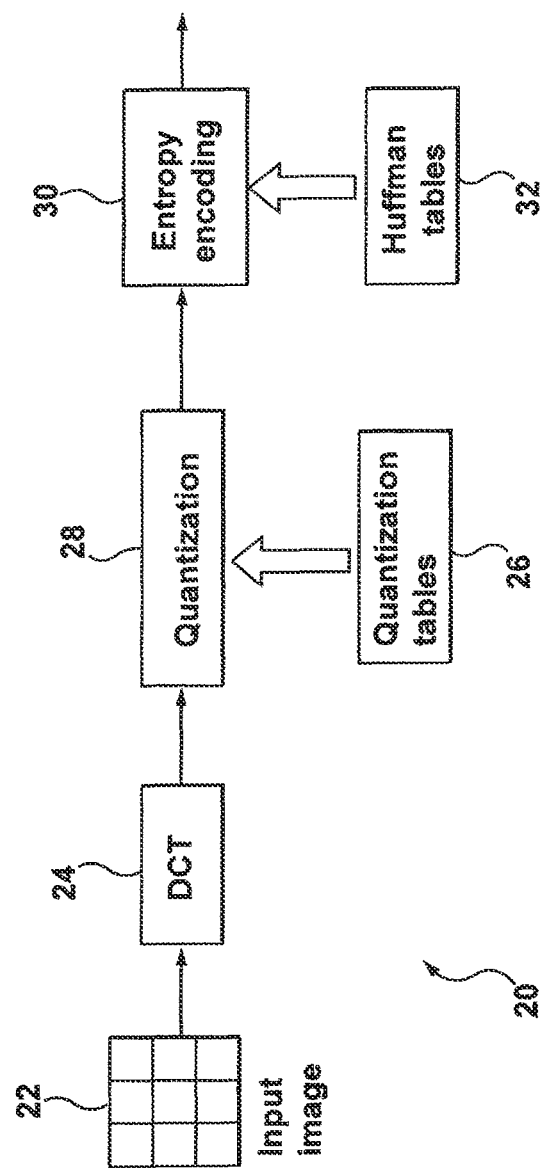
FIG. 1, in a block diagram, illustrates a JPEG encoder.

In one aspect, the present application describes a method of optimal encoding for an image defined by image data. The method includes transforming a block of the image data to DCT coefficients; quantizing the DCT coefficients using a quantization table to generate quantized DCT coefficients, wherein the quantization table includes a plurality of quantization step sizes; and entropy coding the quantized DCT coefficients using zero run-length coding and a Huffman codebook to generate run-size pairs and indices. The quantization table, run-length coding and Huffman codebook are selected to minimize a Lagrangian rate-distortion cost function and the minimization includes iteratively determining the optimal run-size pairs and in-category indices for minimizing the rate-distortion cost function until the incremental improvement in the Lagrangian cost is less than a threshold value. The rate-distortion cost function includes a perceptual weighting factor applied to a quantization error, the perceptual weighting factor adjusting the rate-distortion cost function to apply greater weight to quantization error occurring at smaller quantization step sizes in the quantization table than to quantization error occurring at larger quantization step sizes in the quantization table.

In another aspect, the present application describes a system for optimally encoding an image defined by image data. The system includes memory storing the image data, a quantization table, and a Huffman codebook, wherein the quantization table includes a plurality of quantization step sizes; a DCT transform module configured to transform a block of the image data to DCT coefficients; a quantizer configured to quantize the DCT coefficients using the quantization table to generate quantized DCT coefficients; an encoder configured to entropy coding the quantized DCT coefficients using zero run-length coding and the Huffman codebook to generate run-size pairs and in-category indices; and an optimizer configured to select the quantization table, run-length coding and Huffman codebook to minimize a Lagrangian rate-distortion cost function and wherein the minimization includes iteratively determining the optimal run-size pairs and in-category indices for minimizing the rate-distortion cost function until the incremental improvement in the Lagrangian cost is less than a threshold value. The rate-distortion cost function includes a perceptual weighting factor applied to a quantization error, the perceptual weighting factor adjusting the rate-distortion cost function to apply greater weight to quantization error occurring at smaller quantization step sizes in the quantization table than to quantization error occurring at larger quantization step sizes in the quantization table.

In yet a further aspect, the present application describes a computer program product comprising a computer readable medium storing computer-readable instructions for optimal encoding of an image defined by image data. The computer-readable instructions including instructions for transforming a block of the image data to DCT coefficients; instructions for quantizing the DCT coefficients using a quantization table to generate quantized DCT coefficients, wherein the quantization table includes a plurality of quantization step sizes; and instructions for entropy coding the quantized DCT coefficients using zero run-length coding and a Huffman codebook to generate run-size pairs and in-category indices. The quantization table, run-length coding and Huffman codebook are selected to minimize a Lagrangian rate-distortion cost function and the minimization includes iteratively determining the optimal run-size pairs and in-category indices for minimizing the rate-distortion cost function until the incremental improvement in the Lagrangian cost is less than a threshold value. The rate-distortion cost function includes a perceptual weighting factor applied to a quantization error, the perceptual weighting factor adjusting the rate-distortion cost function to apply greater weight to quantization error occurring at smaller quantization step sizes in the quantization table than to a higher frequency quantization error occurring at larger quantization step sizes in the quantization table.

In another aspect, the present application provides a method of encoding transform domain coefficients for encoding an image. The method includes, iteratively, quantizing the transform domain coefficients to generate quantized transform domain coefficients using quantization step sizes, and entropy encoding the quantized transform domain coefficients using entropy encoding parameters, wherein the quantization step sizes and the encoding parameters are selected to minimize a rate-distortion cost function, until an incremental improvement in the cost is less than a threshold value. The rate-distortion cost function includes a perceptual weighting factor applied to a quantization error, the perceptual weighting factor adjusting the rate-distortion cost function to apply greater weight to quantization error occurring in coefficients quantized by smaller quantization step sizes than to quantization error occurring at coefficients quantized by larger quantization step sizes.

In U.S. patent application Ser. No. 10/924,189, filed Aug. 24, 2004, and entitled "Method, System and Computer Program Product for Optimization of Data Compression", the contents of which are hereby incorporated by reference, inventors Yang and Wang described a method of jointly optimizing run-length coding, Huffman coding and quantization table with complete baseline JPEG decoder compatibility. The present application improves upon the JPEG encoding method, system, and computer program product of Yang and Wang. Portions of the description of Yang and Wang are reproduced below to assist in understanding the present application.

A JPEG encoder 20 executes three basic steps as shown in FIG. 1. The encoder 20 first partitions an input image 22 into 8×8 blocks and then processes these 8×8 image blocks one by one in raster scan order (baseline JPEG). Each block is first transformed from the pixel domain to the DCT domain by an 8×8 DCT 24. The resulting DCT coefficients are then uniformly quantized using an 8×8 quantization table 26. The coefficient indices from the quantization 28 are then entropy coded in step 30 using zero run-length coding and Huffman coding. The JPEG syntax leaves the selection of the quantization step sizes and the Huffman codewords to the encoder provided the step sizes must be used to quantize all the blocks of an image. This framework offers significant opportunity to apply rate-distortion (R-D) consideration at the encoder 20 where the quantization tables 26 and Huffman tables 32 are two free parameters the encoder can optimize.

Figure 2:
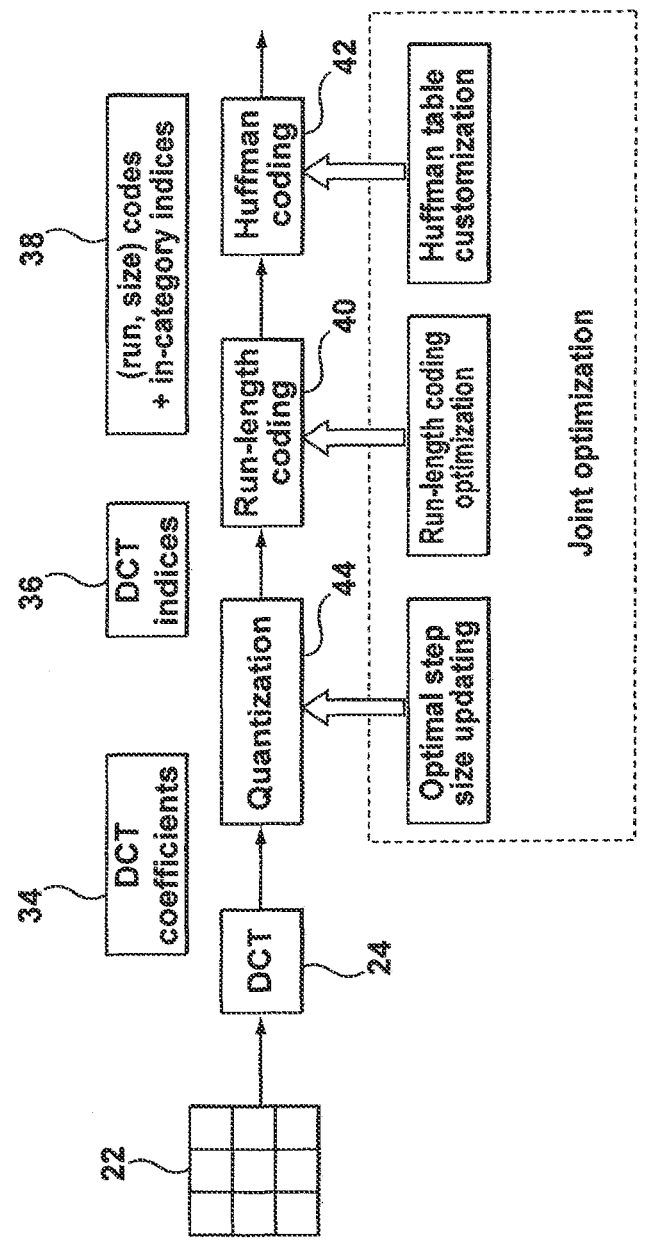
FIG. 2, in a block diagram, illustrates joint optimization of quantization, run-length coding and Huffman coding in accordance with an aspect of the present invention.

The third but somewhat hidden free parameter which the encoder can also optimize is the image data themselves. Depending on the stage where the image date are at during the whole JPEG encoding process, the image data take different forms as shown in FIG. 2. Before hard decision quantization, they take the form of DCT coefficients 34; after hard decision quantization, they take the form of DCT indices 36, i.e., quantized DCT coefficients normalized by the used quantization step size; after zigzag sequencing and run-length coding, they take the form of run-size pairs followed by integers specifying the exact amplitude of DCT indices within respective categories—(run, size) codes and in-category indices 38. (For clarity, we shall refer to such integers as in-category indices.) Note that DCT indices, together with quantization step sizes, determine quantized DCT coefficients. Although the JPEG syntax allows the quantization tables to be customized at the encoder, typically some scaled versions of the example quantization tables given in the standard (called default tables) are used. The scaling of the default tables is suboptimal because the default tables are image-independent and the scaling is not image-adaptive either. Even with an image-adaptive quantization table, JPEG must apply the same table for every image block, indicating that potential gain remains from optimizing the coefficient indices, i.e., DCT indices. Note that hard decision quantization plus coefficient index optimization amounts to soft decision quantization. Since the coefficient indices can be equally represented as run-size pairs followed by in-category indices through run-length coding, we shall simply refer to coefficient index optimization as run-length coding optimization in parallel with step size and Huffman coding optimization. As will be described below, a graph-based run-length code optimization scheme is described as well as an iterative optimization scheme for jointly optimizing the run-length coding, Huffman coding and quantization step sizes as in steps 40, 42 and 44, respectively, of FIG. 2.

Formal Problem Definition

A joint optimization problem may be defined, where the minimization is done over all the three free parameters in the baseline JPEG. The optimization of AC coefficients is considered in this section. The optimization of DC coefficients is discussed afterwards.

Given an input image $I_0$ and a fixed quantization table Q in the JPEG encoding, the coefficient indices for each 8×8 block completely determine, through run-length coding, a sequence consisting of run-size pairs followed by in-category indices, and vice versa, i.e., such a sequence determines the coefficient indices. The problem is posed as a constrained optimization over all possible sequences of run-size pairs (R, S) followed by in-category indices ID, all possible Huffman tables H, and all possible quantization tables Q, i.e., the problem is to achieve the following minimum $$\min_{(R,S,ID),H,Q} d[I_0, (R, S, ID)_Q] \text{ subject to } r[(R, S), H] \leq r_{budget} \quad (10)$$

or, equivalently, the minimum $$\min_{(R,S,ID),H,Q} r[(R, S), H] \text{ subject to } d[I_0, (R, S, ID)_Q] \leq d_{budget} \quad (11)$$

where $d[I_0,(R,S,ID)_Q]$ denotes the distortion between the original image $I_0$ and the reconstructed image determined by (R,S,ID) and Q over all AC coefficients, and r[(R,S),H] denotes the compression rate for all AC coefficients resulting from the chosen sequence (R, S, ID) and the Huffman table H. In (10) and (11), respectively, $r_{budget}$ and $d_{budget}$ are respectively the rate constraint and distortion constraint. With the help of the Lagrange multiplier, the rate-constrained problem or distortion-constrained problem may be converted into the unconstrained problem of achieving the following minimum $$\min_{(R,S,ID),H,Q} \{J(\lambda) = d[I_0, (R, S, ID)_Q] + \lambda \cdot r[(R, S), H]\} \quad (12)$$

where the Lagrangian multiplier $\lambda$ is a fixed parameter that represents the tradeoff of rate for distortion, and $J(\lambda)$ is the Lagrangian cost. This type of optimization falls into the category of so-called fixed slope coding advocated in E.-h. Yang, Z. Zhang, and T. Berger, "Fixed slope universal lossy data compression," IEEE Trans. Inform. Theory, vol. 43, pp. 1465-1476, September 1997 (hereinafter "reference [10]") and E.-h. Yang and Z. Zhang, "Variable-rate trellis source coding." IEEE Trans. Inform. Theory, vol. 45, pp. 586-608, March 1999 (hereinafter "reference [11]").

Problem Solutions

The rate-distortion optimization problem (12) is a joint optimization of the distortion, rate, Huffman table, quantization table, and sequence (R,S,ID). To make the optimization problem tractable, an iterative algorithm may be used that selects the sequence (R,S,ID), Huffman table, and quantization table iteratively to minimize the Lagrangian cost of (12), given that the other two parameters are fixed. Since a run-size probability distribution P completely determines a Huffman table, we use P to replace the Huffman table H in the optimization process. The iteration algorithm can be described as follows:

1) Initialize a run-size distribution $P_0$ from the given image $I_0$ and a quantization table $Q_0$. The application of this pre-determined quantization table $Q_0$ to $I_0$ is referred to as hard-quantization, in that quantization is image-independent. (As an example, the initial run-size distribution $P_0$ could be the empirical distribution of the sequence of (run, size) pairs obtained from using a hard-decision quantizer given by the initial $Q_0$ to quantize the DCT coefficients of $I_0$.) Set t=0, and specify a tolerance $\epsilon$ as the convergence criterion.

2) Fix $P_t$ and $Q_t$ for any t≧0. Find an optimal sequence $(R_t,S_t,ID_t)$ that achieves the following minimum $$\min_{R,S,ID} \{J(\lambda) = d[I_0, (R, S, ID)_{Q_t}] + \lambda \cdot r[(R, S), P_t]\}.$$

Denote $d[I_0,(R_t,S_t,ID_t)_{Q_t}]+\lambda \cdot r[(R_t,S_t),P_t]$ by $J^t(\lambda)$.

3) Fix $(R_t,S_t,ID_t)$. Update $Q_t$ and $P_t$ so that respective updates $Q_{t+1}$ and $P_{t+1}$ together achieve the following minimum $$\min_{(Q,P)} \{J(\lambda) = d[I_0, (R, S, ID_t)_Q] + \lambda \cdot r[(R_t, S_t), P]\}$$

where the above minimization is taken over all quantization tables Q and all run-size probability distributions P. Note that $P_{t+1}$ can be selected as the empirical run-size distribution of $(R_t,S_t)$.

4) Repeat Steps 2) and 3) for t=0, 1, 2, ... until $J^t(\lambda)-J^{t+1}(\lambda) \leq \epsilon$. Then output $(R_{t+1},S_{t+1},ID_{t+1}),Q_{t+1}$, and $P_{t+1}$.

Since the Lagrangian cost function is non-increasing at each step, convergence is guaranteed. The core of the iteration algorithm is Step 2) and Step 3), i.e., finding the sequence (R,S,ID) to minimize the Lagrangian cost $J(\lambda)$ given Q and P, and updating the quantization step sizes with the new indices of the image. These two steps are addressed separately as follows.

Graph-Based Run-Length Coding Optimization

As mentioned above, JPEG quantization lacks local adaptivity even with an image-adaptive quantization table, which indicates that potential gain remains from the optimization of the coefficient indices themselves. This gain is exploited in Step 2). Optimal thresholding only considers a partial optimization of the coefficient indices, i.e., dropping coefficients that are less significant in the R-D sense. Herein is described an efficient graph-based optimal path searching algorithm to optimize the coefficient indices fully in the R-D sense. It can not only drop less-significant coefficients, but also can change them from one category to another—even changing a zero coefficient to a small nonzero coefficient is possible if needed in the R-D sense. In other words, this graph-based optimal path searching algorithm finds the optimal coefficient indices (or equivalently, the optimal run-size pairs) among all possible coefficient indices (or equivalently, among all possible run-size pairs) to minimize the Lagrangian cost. Since given Q and P, the Lagrangian cost J(λ) is block-wise additive, the minimization in Step 2) can be solved in a block by block manner. That is, the optimal sequence (R,S,ID) can be determined independently for every 8×8 image block. Thus, in the following, discussion is limited to only one 8×8 image block.

Figure 3:
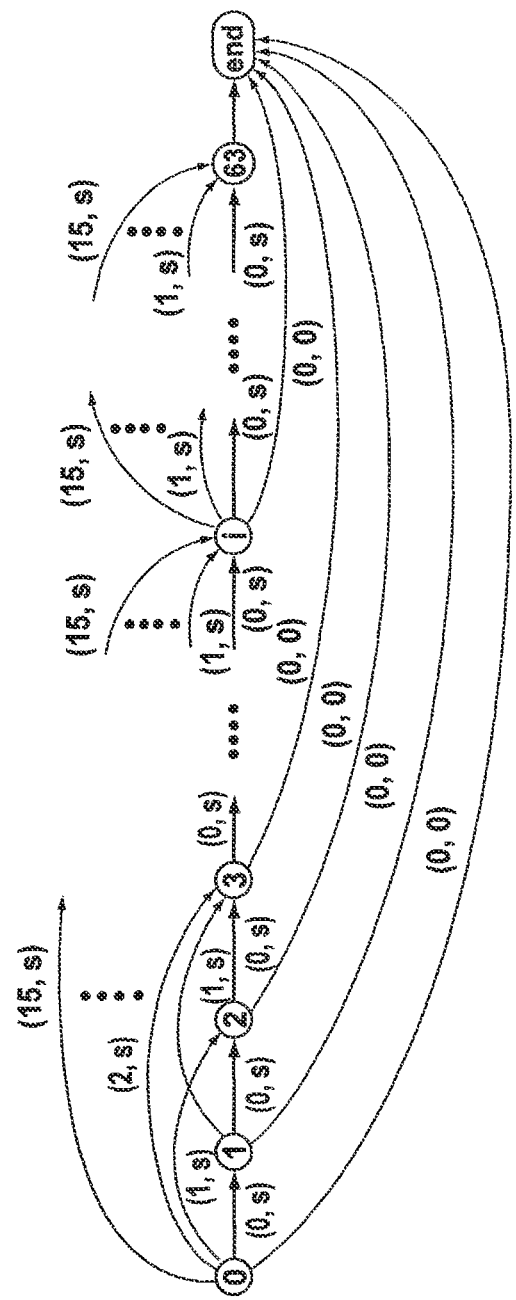
FIG. 3 illustrates a directed graph for representing different possible coefficient indices (or, equivalently, their run-size pairs) in accordance with an aspect of the present invention.

Let us define a directed graph with 65 nodes (or states). As shown in FIG. 3, the first 64 states, numbered as i=0, 1, . . . 63, correspond to the 64 coefficient indices of an 8×8 image block in zigzag order. The last state is a special state called the end state, and will be used to take care of EOB (end-of-block). Each state i ($i \leq 63$) may have incoming connections from its previous 16 states j (j<i), which correspond to the run, R, in an (R,S) pair. (In JPEG syntax, R takes value from 0 to 15.) The end state may have incoming connections from all the other states with each connection from state i($i \leq 62$) representing the EOB code, i.e., code (0,0) after the $i^{th}$ coefficient. State 63 goes to the state end without EOB code. For a given state i($i \leq 63$) and each of its predecessors i−r−1($0 \leq r \leq 15$), there are 10 parallel transitions between them which correspond to the size group, S, in an (R,S) pair. For simplicity, only one transition is shown in the graph in FIG. 3; the complete graph would show the expansion of S. For each state i, where i>15, there is one more transition from state i−16 to i which corresponds to the pair (15,0), i.e., ZRL (zero run length) code. Each transition (r,s) from state i−r−1 to state i is assigned a cost which is defined as the incremental Lagrangian cost of going from state i−r−1 to state i when the $i^{th}$ DCT coefficient is quantized to size group s (i.e., the coefficient index needs s bits to represent its amplitude) and all the r DCT coefficients appearing immediately before the $i^{th}$ DCT coefficient are quantized to zero. Specifically, this incremental cost is equal to $$\sum_{j=i-r}^{i-1} C_j^2 + |C_i - q_i \cdot ID_i|^2 + \lambda \cdot (-\log_2 P(r, s) + s) \quad (13)$$

where $C_j$, j=1, 2, . . . 63, are the $j^{th}$ DCT coefficient, $ID_i$ is the in-category index corresponding to the size group s that gives rise to the minimum distortion to $C_i$ among all in-category indices within the category specified by the size groups, and $q_i$ is the $i^{th}$ quantization step size. Similarly, for the transition from state i($i \leq 62$) to the end state, its cost is defined as $$\sum_{j=i+1}^{63} C_j^2 + \lambda \cdot (-\log_2 P(0, 0)) \quad (14)$$

No cost is assigned to the transition from state 63 to the end state.

Figure 4:
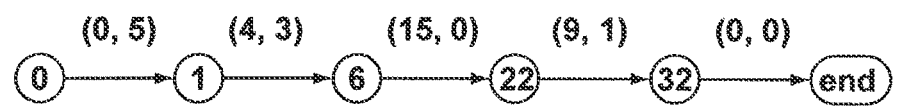
FIG. 4 illustrates a sequence of connections and nodes from the graph of FIG. 3.

It will be understood that with the above definitions, every sequence of run-size pairs of an 8×8 block corresponds to a path from state 0 to the end state with a Lagrangian cost. For example, the sequence of run-size pairs (0, 5), (4, 3), (15, 0), (9, 1), (0, 0) of a block corresponds to a path shown in FIG. 4. On the other hand, not all paths from state 0 to the end state in the directed graph represent a legitimate sequence of run-size pairs of an 8×8 block. Such paths are called illegitimate paths. For instance, the path consisting of a transition (0,5) from state 0 to state 1 followed by a transition (15,0) from state 1 to state 17 and a transition (0,0) from state 17 to the end state is an illegitimate path, and does not represent a legitimate sequence of run-size pairs of an 8×8 block. However, it is not hard to see that for any illegitimate path, there is always a legitimate path the total Lagrangian cost of which is strictly less than that of the illegitimate path. Therefore, the optimal path from state 0 to the end state with the minimum total Lagrangian cost among ALL possible paths including both legitimate paths and illegitimate paths is always a legitimate path. Furthermore, the optimal path, together with its corresponding in-category indices as determined in (13), achieves the minimum in Step 2) for any given Q, P and 8×8 block. As such, one can apply a fast dynamic programming algorithm to the whole directed graph to find the optimal sequence (R,S, ID) for the given 8×8 block. It should be pointed out that baseline JPEG syntax will not generate an (R, S) sequence ended by (15, 0) for an 8×8 block. Theoretically, the optimal (R, S) sequence found by dynamic programming may end by (15,0) through state 63 even though it is very unlikely to occur in real applications (it might occur when the entropy rate of (15, 0) is less than the entropy rate of (0, 0)). However, an (R, S) sequence ended by (15, 0) through state 63 is a legitimate path and can be encoded/decoded correctly by baseline JPEG syntax.

A more elaborate step-by-step description of the algorithm follows. As an initialization, the algorithm pre-calculates λ·(−log$_2$P(r,s)+s) for each run-size pair (r,s) based on the given run-size distribution P. It also recursively pre-calculates, for each state i, the distortion resulting from dropping the preceding 1 to 15 coefficients before the state and the remaining cost of ending the block at the state. The algorithm begins with state 0 (DC coefficient). The cost of dropping all AC coefficients is stored in $J_0$. Then, one proceeds to state 1 (the first AC coefficient). There are ten paths to state 1 which all start from state 0. These ten paths correspond to the 10 size categories that the first AC index may fall into. The cost associated with each path is calculated using equation (13), where the first term in (13) is also pre-calculated, and $ID_i$ is determined as follows. For simplicity, consider only positive indices here; negative indices are processed similarly by symmetry. Suppose $ID_i'$ is the output of the hard-decision quantizer with step size $q_i$ in response to the input $C_i$, and it falls into the category specified by s'. If s=s', $ID_i$ is chosen as $ID_i'$ since it results in the minimum distortion for $C_i$ in this size group. If s<s', $ID_i$ is chosen as the largest number in size group s since this largest number results in the minimum distortion in this group. Similarly, if s>s', $ID_i$ is chosen as the smallest number in size group s. After the ten incremental costs have been computed out, we can find the minimum cost to state 1 from state 0 and record this minimum cost as well as the run-size pair (r,s) which results in this minimum to state 1. Then, the cost of dropping all coefficients from 2 to 63 is added to the minimum cost of state 1. This sum is stored in $J_1$, which is the total minimum cost of this block when the first AC coefficient is the last nonzero coefficient to be sent. Proceeding to state 2, there are 110 paths to state 2 from state 0. Among them, ten paths go to state 2 from state 0 directly and 100 paths go to state 2 from state 0 through state 1 (10 times 10). The most efficient way of determining the best path that ends in state 2 is to use the dynamic programming algorithm. Since the minimum costs associated with ending at state 0 and state 1 are known, the job of finding the minimum cost path ending in state 2 is simply to find the minimum incremental costs of going from state 0 to state 2 and from state 1 to state 2. Add these two minimum incremental costs to the minimum costs of state 0 and 1 respectively; the smaller one between the two sums is the minimum cost of state 2. This minimum cost and the run-size pair (r,s) which results in this minimum cost are stored in state 2. Then, the cost of dropping all coefficients from 3 to 63 is added to the minimum cost of state 2. This sum is stored in $J_2$, which is the total minimum cost of this block when the second AC coefficient is the last nonzero coefficient to be sent. Note that, if the minimum path to state 2 is from state 0 directly, the stored r in the stored run-size pair (r,s) of state 2 is 1, which means the first AC is quantized or forced to zero. If the minimum path to state 2 is from state 1, the stored r is 0, which means the first AC index is nonzero. The recursion continues to the third coefficient and so on until the last coefficient at position 63 is done. At this point, we compare the values of $J_k$, k=0, 1, . . . 63, and find the minimum value, say, $J_k$ for some k*. By backtracking from k* with the help of the stored pairs (r,s) in each state, one can find the optimal path from state 0 to the end state with the minimum cost among all the possible paths, and hence the optimal sequence (R,S,ID) for the given 8×8 block. A pseudo-code of this algorithm is illustrated in FIGS. 6a, 6b and 6c.

The above procedure is a full dynamic programming method. To further reduce its computational complexity, it may be modified slightly. In particular, in practice, the incremental costs among the 10 or 11 parallel transitions from one state to another state do not need to be compared. Instead, it may be sufficient to compare only the incremental costs among the transitions associated with size group s−1, s, and s+1, where s is the size group corresponding to the output of the given hard-decision quantizer. Transitions associated with other groups most likely result in larger incremental costs.

Optimal Quantization Table Updating

To update the quantization step sizes in Step 3), the following minimization problem is to be solved:

$$\min_Q d[I_0, (R, S, ID)_Q]$$

since the compression rate does not depend on Q once (R,S,ID) is given, where $I_0$ denotes the original input image to be compressed, and $Q=(q_0, q_1, \ldots, q_{63})$ represents a quantization table. Let $C_{i,j}$ denote the DCT coefficient of $I_0$ at the $i^{th}$ position in the zigzag order of the $j^{th}$ block. The sequence (R,S,ID) determines DCT indices, i.e., quantized DCT coefficients normalized by the quantization step sizes. Let $K_{i,j}$ denote the DCT index at the $i^{th}$ position in the zigzag order of the $j^{th}$ block obtained from (R,S,ID). Then the quantized DCT coefficient at the $i^{th}$ position in the zigzag order of the $j^{th}$ block is given by $K_{i,j}q_i$. With help of $C_{i,j}$ and $K_{i,j}q_i$, we can rewrite $d[I_o,(R,S,ID)_Q]$ as $$d[I_0, (R, S, ID)_Q] = \sum_{i=1}^{63} \sum_{j=1}^{Num\_Blk} (C_{i,j} - K_{i,j}q_i)^2 \quad (15)$$

where Num_Blk is the number of 8×8 blocks in the given image.

From (15), it follows that the minimization of $d[I_0,(R,S,ID)_Q]$ can be achieved by minimizing independently the inner summation of (15) for each i=1, 2, . . . , 63. The goal is to find a set of new quantization step size 63) to minimize $$\min_{\hat{q}_i} \sum_{j=1}^{Num\_Blk} (C_{i,j} - K_{i,j}\hat{q}_i)^2, i = 1, \ldots, 63 \quad (16)$$

Equation (16) can be written as $$\min_{\hat{q}_i} \sum_{j=1}^{Num\_Blk} C_{i,j}^2 - 2C_{i,j}K_{i,j}\hat{q}_i + K_{i,j}^2\hat{q}_i^2, i = 1, \ldots, 63 \quad (17)$$

The minimization of these quadratic functions can be evaluated by taking the derivative of (17) with respect to $\hat{q}_i$. The minimum of (16) is obtained when $$q = \frac{\sum_{j=1}^{Num\_Blk} C_{i,j} \cdot K_{i,j}}{\sum_{j=1}^{Num\_Blk} K_{i,j}^2}, i = 1, \ldots, 63 \quad (18)$$

The step sizes in Step 3) can be updated accordingly.

Trellis-Based DC Optimization

In this subsection, we consider the joint optimization of the quantized DC coefficients with the quantization step size and Huffman table. In JPEG syntax, the quantized DC coefficients are coded differentially, using a one-dimensional predictor, which is the previous quantized DC value. Since the cost of encoding a quantized DC coefficient only depends on the previous quantized DC coefficient, a trellis can be used in the joint optimization.

Figure 5:
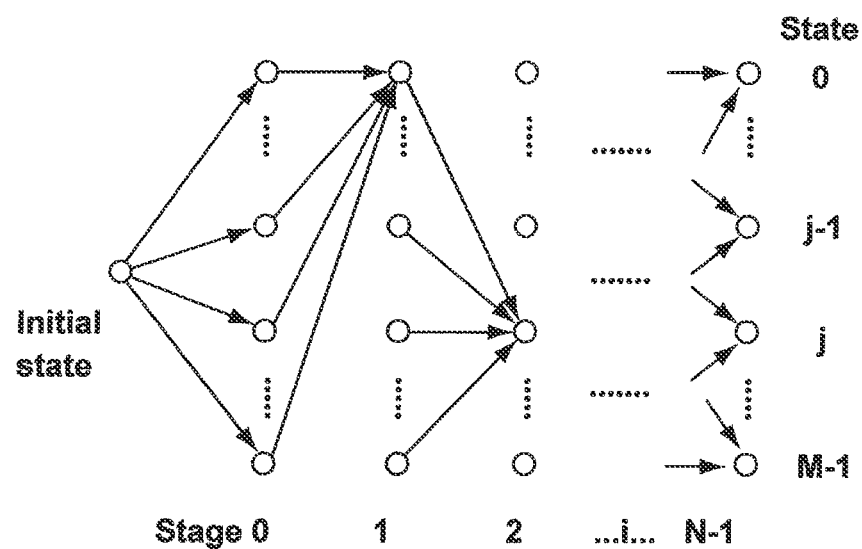
FIG. 5 illustrates a trellis structure for representing distinct values a DC index can take for a sequence of n coefficients in accordance with a further aspect of the present invention.

Let us define a trellis with N stages, which correspond to the number of DC coefficients, i.e., the number of 8×8 blocks in a restart interval (the DC coefficient prediction is initialized to 0 at the beginning of each restart interval and each scan). Each stage has M states, which correspond to the distinct values a DC index can take, and states in adjacent stages are fully connected, as shown in FIG. 5. Every state in each stage is associated with a cost which is the minimum cost to this state from the initial state. The process of finding the optimal DC index sequence starts from stage 0 until stage N−1. At stage N−1, the state with the minimum cost is sorted out and the optimal path from stage 0 to stage N−1 with the minimum cost is traced out backward, yielding the optimal DC index sequence.

A more elaborate step-by-step description of the process follows. Let x(i,j) denote the $j^{th}$ state in stage i (0≦i≦N−1, 0≦j≦M−1) and v(i,j) represent the DC index value corresponding to state x(i,j). Let cost_mini (i,j) denote the minimum cost to x(i,j) from the initial state. Let cost_inc (i−1,j',i,j) represent the incremental cost from x(−1,j') to x(i,j), which is defined as $$\text{cost\_inc}(i-1,j',i,j)=|DC_i-q_0 \cdot v(i,j)|^2+\lambda \cdot (-\log_2 P(S)+S) \quad (19)$$

where $q_0$ is the quantization step size for DC coefficients, $DC_i$ is the $i^{th}$ DC coefficient, S is the group category of the difference |v(i,j)−v(i−1,j')| and P(S) is its probability among the 12 size categories (0≦S≦11). The cost associated with the initial state is set to zero. We start from stage 0. Since each state only has one incoming path, the cost to each state in stage 0 is the incremental cost from the initial state. Then, we proceed to stage 1 and start with state 0. There are M incoming paths to x(1,0) from x(0,j')(0≦j'≦M−1). The M incremental costs (i.e., cost_inc (0,j',1,0) are calculated using equation (19) and these M incremental costs are added to the M minimum costs associated with the M states at stage 0, respectively. The minimum is sorted out and recorded as cost_mini (1,0) for state x(1,0). The optimal predecessor is also recorded for the purpose of backtracking. In the same manner, we need to find cost_mini $(1,j)(1 \leq j \leq M-1)$ and the optimal predecessors for other M−1 states in stage 1. This procedure continues to stage 2 and so on until stage N−1. At this point, we can find j* with the smallest cost_mini (N−1,j) for $0 \leq j \leq M-1$. This cost-mini (N−1,j*) is the minimum cost of the optimal path from the initial state to stage N−1. By backtracking from j* with the help of the stored optimal predecessor in each state, one can find the optimal path from the initial state to stage N−1, hence, the optimal DC index sequence.

After the optimal sequence of DC indices is obtained, we may update P(S) and the quantization step size $q_0$ in the same manner as discussed above. Then the optimization process is iterated as we did for the joint optimization of the quantized AC coefficients with the quantization step size and Huffman table.

A DC index can take up to 2047 different values (−1023 to 1023) in baseline JPEG, which requires 2047 states in each stage. This large number of states not only increases the complexity of the above algorithm but also demands plenty of storage locations. In practice, if a DC coefficient is soft-quantized to a value that is far from the output of a hard-decision quantizer, it most likely results in a higher cost path. Therefore, in one implementation of the trellis-based DC optimization, we may only set a small number of states which correspond to the DC indices that are around the output of a hard-decision quantizer. For example, we may only use 33 states in each stage with the middle state corresponding to the output of a hard-decision quantizer, and the upper and lower 16 states respectively corresponding to the 16 neighboring indices that are larger or smaller than the output of the hard-decision quantizer. This reduces the computation complexity and memory requirement significantly with only a slight degradation of the performance.

Figure 7:
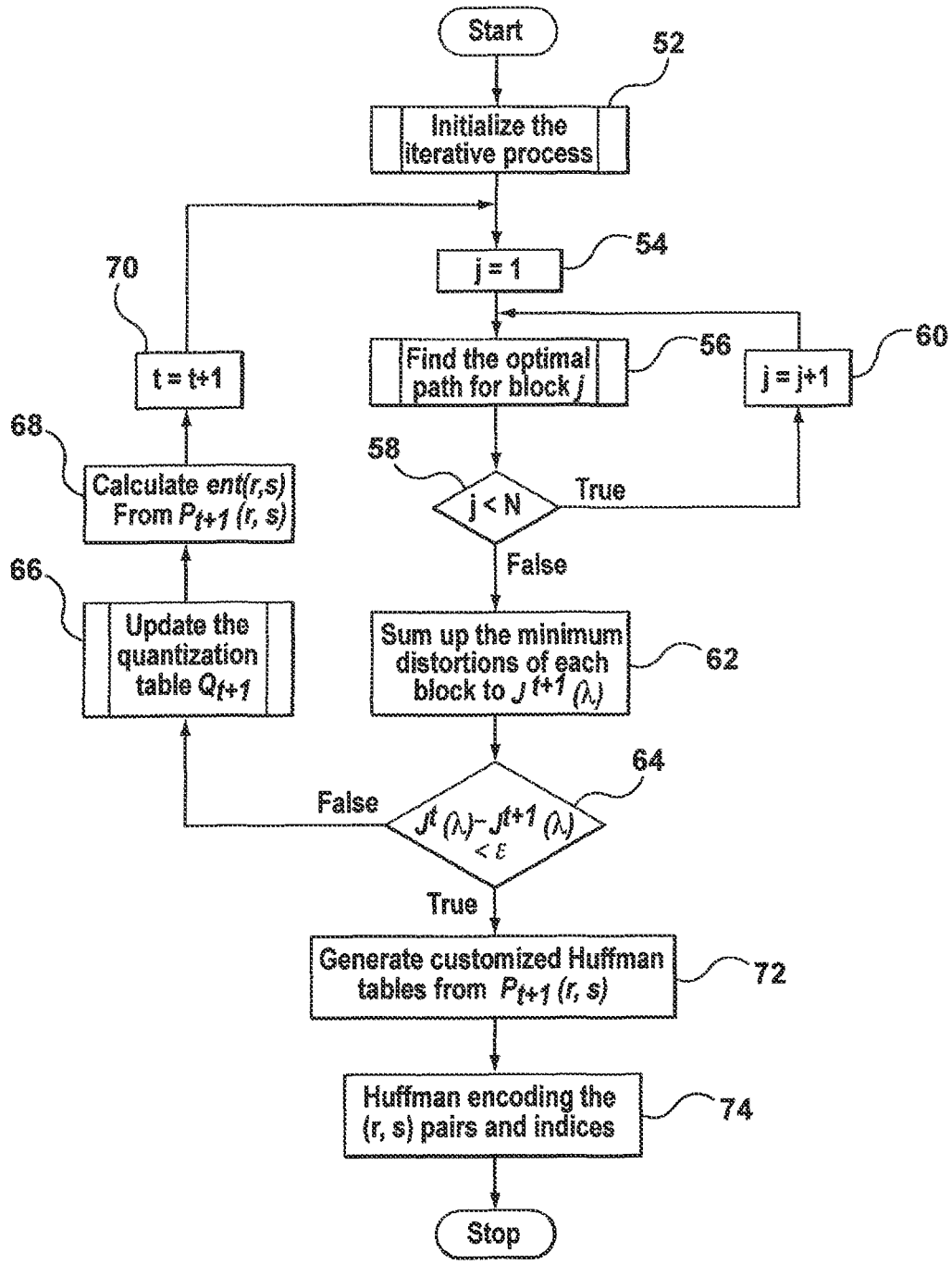
FIG. 7, in a flowchart, illustrates a process for jointly optimizing run-length coding, Huffman coding and quantization table in accordance with an aspect of the present invention.

A process for jointly optimizing the run-length coding, Huffman coding and quantization table in accordance with an aspect of the invention is shown in the flowchart of FIG. 7. At step 52, the iterative process is initialized, as outlined in detail in the flowchart of FIG. 8. At step 54, j, the index representing the $j^{th}$ block of N total blocks is set to 1. At step 56, the process determines the optimal path for block j, in this case, the first block. This is outlined in detail in the flowchart of FIG. 9. At query 58, it is determined whether j is the final block. This is achieved by comparing j to N (the total number of blocks). Where j is less than N, j is incremented in step 60.

The process of finding the optimal path for each block j continues until j=N. When j=N, an optimal path for each of the N blocks will have been determined. The $(t+1)^{th}$ value of J(λ) is computed in step 62 as the sum of the minimum distortions associated with each of the N blocks. This value is then compared against the $t^{th}$ value of J(λ) in query 64. Where the difference between the $t^{th}$ value of J(λ) and the $(t+1)^{th}$ value of J(λ) is less than ε (the selection criterion, or more specifically, the convergence criterion), the optimization is considered complete. Where this is not the case, the joint optimization process moves to step 66 and quantization table $Q_{t+1}$ is updated, as outlined in detail in the flowchart of FIG. 12.

At step 68, the $(t+1)^{th}$ probability distribution function is used to calculate the entropy rate associated with run-size pair (r,s). At step 70, index t is incremented and an additional iteration is subsequently performed. Where it was determined that the selection criterion was satisfied in query 64, the $(t+1)^{th}$ probability distribution function associated with run-size pair (r,s) is used to generate customized Huffman tables in step 72. Step 74 uses these customized Huffman tables to encode the run-size pairs and indices. The process for jointly optimizing the run-length coding, Huffman coding and quantization table are complete.

Figure 8:
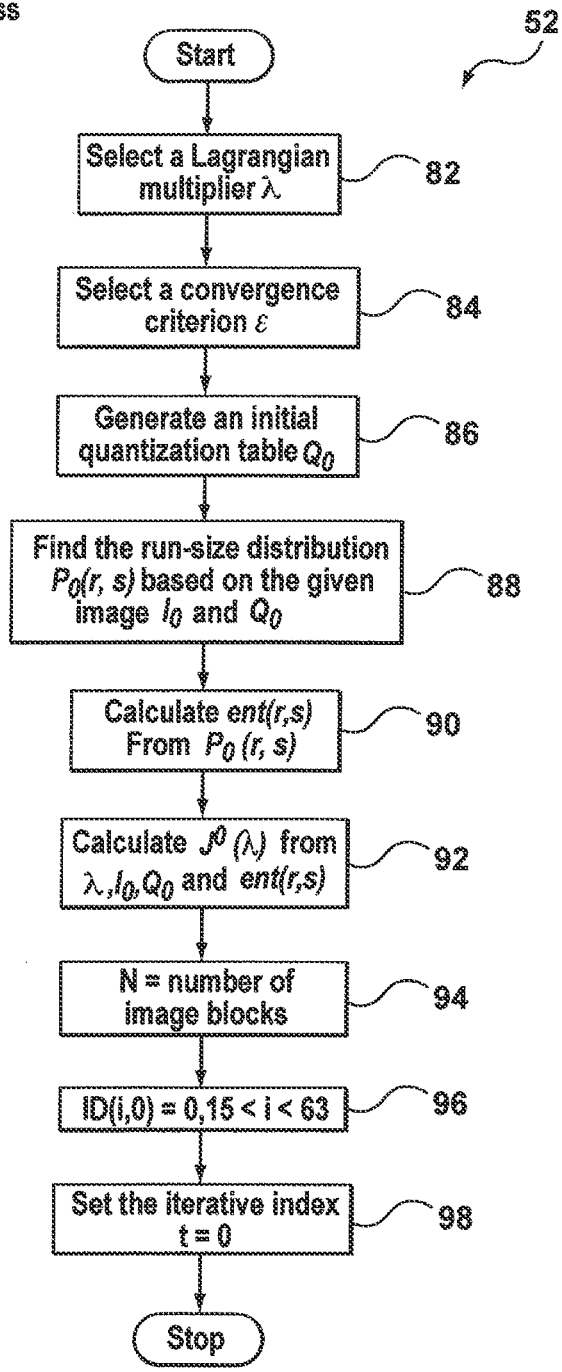
FIG. 8, in a flowchart, illustrates an initialization of an iterative process of the process of FIG. 7.

Referring now to the flowchart of FIG. 8, the initialization of the iterative process in step 52 of the flowchart of FIG. 7 is described in more detail. At step 82, a Lagrangian multiplier, λ, is selected. This is a fixed parameter that represents the trade off of rate for distortion. At step 84, the convergence criterion ε is selected. This is the amount the difference of the Lagrangian costs, $J^t(\lambda)$, of successive iterations must be below for the iteration to be deemed successful and complete.

In step 86, an initial quantization table $Q_0$ is generated. Step 88 uses the given image $I_0$ and the quantization table $Q_0$ generated in the previous step to determine the run-size distribution $P_0(r,s)$. At step 90, this run-size distribution is then used to calculate the entropy rate associated with the run-size pair (r,s). At step 92, the initial Lagrangian cost $J^0(\lambda)$ is calculated based on the original DCT coefficients and the Lagrangian multiplier λ, the quantization table $Q_0$, and the entropy rate associated with run-size pair (r,s). At step 94, N is set to be equal to the number of image blocks and at step 96, ID(i,0), the index to be sent for the $i^{th}$ DCT coefficient when the index is forced to size group 0, for 15<i<63, is set to 0. Finally, at step 98, t, the index for the iteration, is set equal to 0, and the process of initializing the iterative process is complete.

Figure 9:
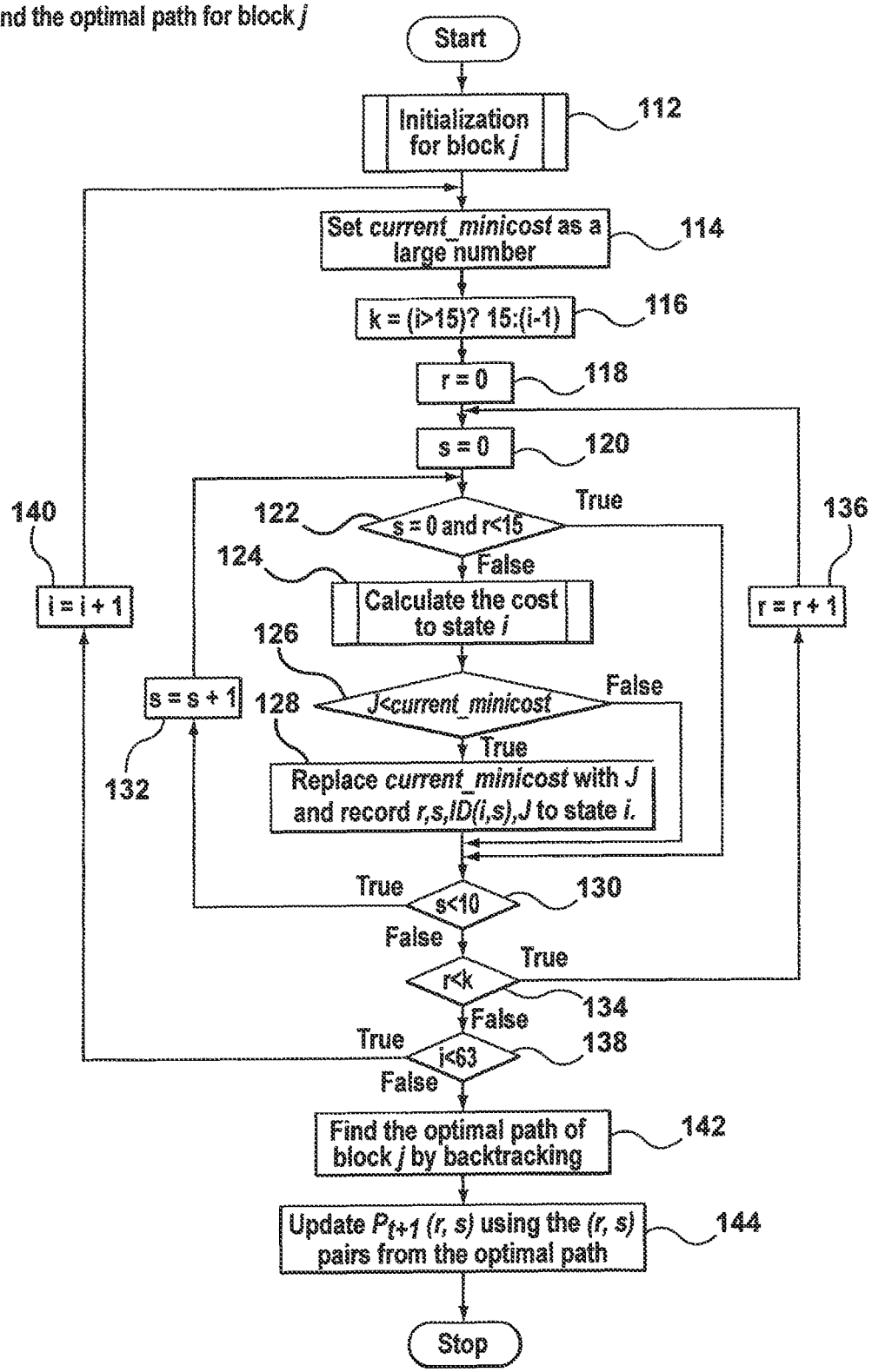
FIG. 9, in a flowchart, illustrates a process for determining an optimal path for a particular block in the process of FIG. 7.

Referring now to the flowchart of FIG. 9, the process for determining the optimal path for block j of step 56 in the flowchart of FIG. 7 is described in more detail. At step 112, block j is initialized, as outlined in detail in the flowchart of FIG. 10. At step 114, current_minicost, the variable that stores the current lowest Lagrangian cost to state i for block j is set to a large number. At step 116, variable k is assigned a value to represent the number of incoming connections from previous states. Where i>15, k is assigned a value of 15. Where i≤15, k=i−1. At step 118, r, the variable associated with run, is set equal to 0 and at step 120, s, the variable associated with size group, is set to 0.

At query 122, the process determines whether both of the relations s=0 and r<15 are true. Where this is not the case, the cost to state i is calculated in step 124, as outlined in more detail in the flowchart of FIG. 11. At query 126, the cost to state i is compared to the current minimum cost, current_minicost. Where J, the cost to state i is less than current_minicost, current_minicost is replaced with J and the variables r, s, id(i,s) and J are stored to state i in step 128.

From step 128, as well as from query 126 when the current cost was not less than current_minicost and from query 122 when it was found that s=0 and r<15 held true, the process proceeds to query 130, which asks whether s is less than 10. Where s<10, s is incremented at step 132 and the iteration associated with calculating the cost to state i is repeated with the updated variables. Where in query 130, query 134 asks whether r is less than k. Where r<k, r is incremented at step 136, s is reset to 0 at 120 and the iteration for calculating the cost to state i is repeated. However, where r is not less than k, query 138 asks whether i is less than 63. Where this is the case, i is incremented at step 140 and the entire iteration is repeated. Where i is not less than 63, all of the costs are deemed to have been calculated and the optimal path of block j is determined by backtracking in step 142. At step 144, the run-size pairs (r,s) from the optimal path are used to update the run-size probability distribution function $P_{t+1}(r,s)$ and the process for finding the optimal path for block j is complete.

Figure 10:
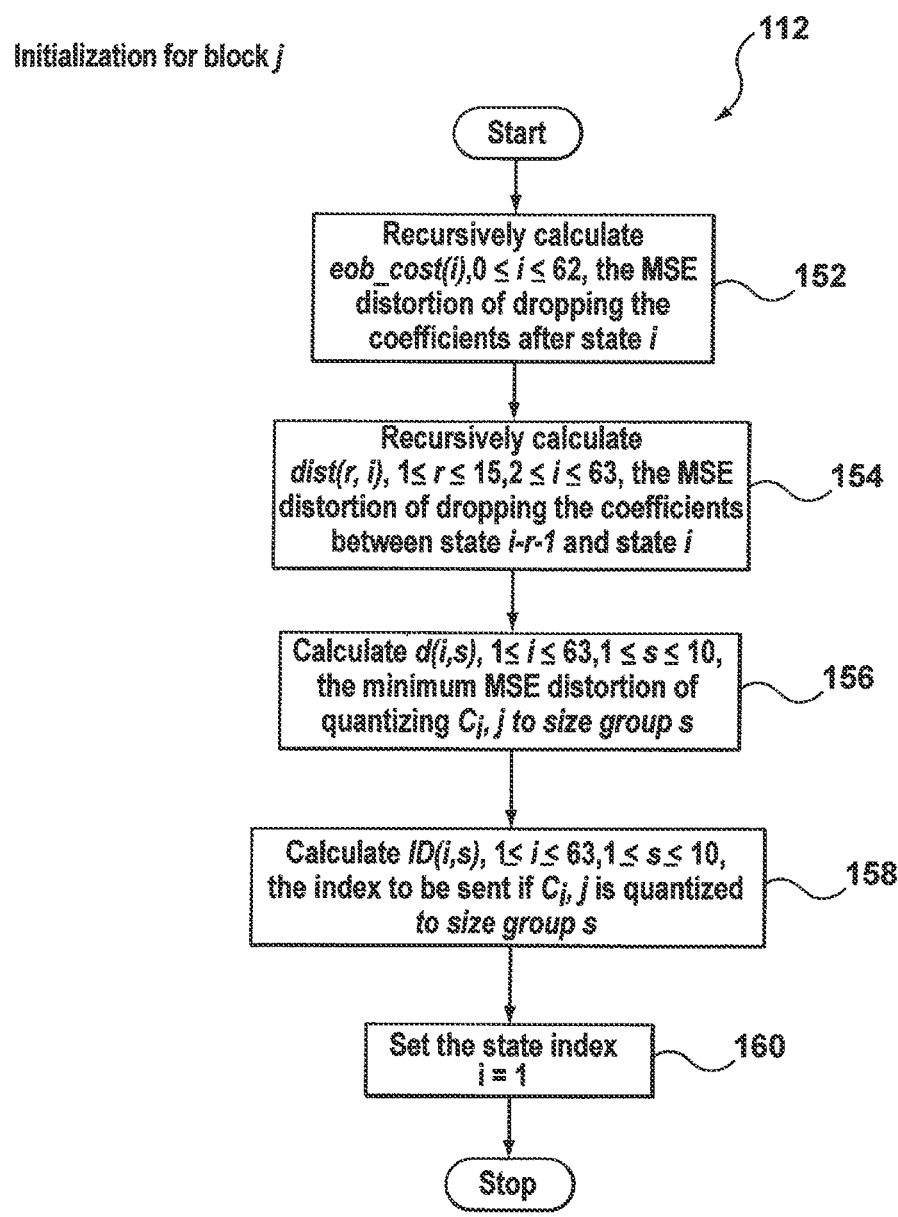
FIG. 10, in a flowchart, illustrates a block initializing process invoked by the optimal path determination process of FIG. 9.

Referring now to the flowchart of FIG. 10, the initialization for block j of step 112 of the flowchart of FIG. 9 is described in more detail. In step 152, the end of block cost, eob_cost(i) is recursively calculated for $0 \leq i \leq 62$. This corresponds with the cost of dropping all of the coefficients after state i. At step 154, the distortion, dist(r,i) is recursively calculated for $i \leq r \leq 15$ and $2 \leq i \leq 63$. This refers to the mean square distortion (MSE) of dropping all of the coefficients between state i−r−1 and state i.

At step 156, a second distortion metric, d(i,s) is calculated for $1 \leq i \leq 63$ and $1 \leq s \leq 10$. This is the mean square distortion (MSE) resulting from the $i^{th}$ DCT coefficient ($1 \leq i \leq 63$) when the corresponding index is forced into size group s. At step 158, the index to be sent for the $i^{th}$ DCT coefficient when the index is in size group s, id(i,s), is calculated for $1 \leq i \leq 63$ and $1 \leq s \leq 10$. Finally, at step 160, the state index i is set equal to 1 and the initialization for block j is complete.

Figure 11:
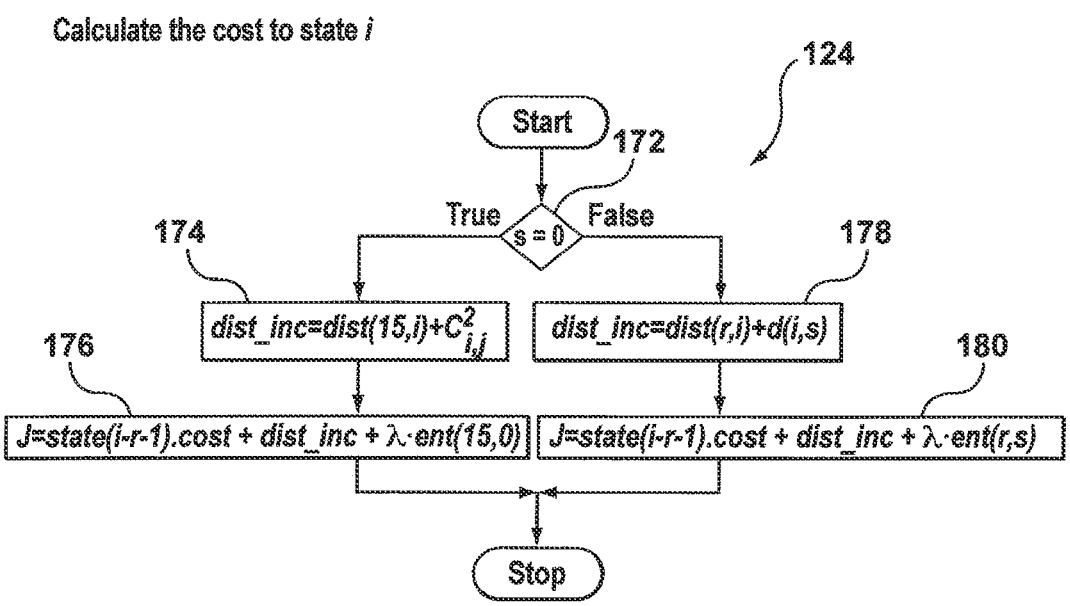
FIG. 11, in a flowchart, illustrates a incremental cost calculating process invoked by the process of FIG. 9.

Referring now to the flowchart of FIG. 11, the procedure for calculating the cost to state i, step 124 of the flowchart of FIG. 9 is described in detail. Query 172 asks whether s is equal to 0. Where this is found to be true, step 174 determines the incremental distortion from state i−r−1 (where r=15) to state i as the sum of the mean square distortion of dropping all of the coefficients between state i−16 and i, and the mean square distortion of dropping the $i^{th}$ DCT coefficient in the current block. Then, the cost to state i, is computed in step 176 as the sum of the cost to state i−r−1, the incremental distortion from state i−r−1 to state i and the entropy rate associated with the run-size pair (15,0) scaled by λ.

Where s was not equal to 0 at query 172, the incremental distortion is computed in step 178 as the sum of the mean square distortion of dropping all of the coefficients between state i−r−1 and state i and the mean square distortion resulting from the $i^{th}$ DCT coefficient when the corresponding index if forced into size group s. The cost to state i is then computed in step 180 as the sum of the cost to state i−r−1, plus the incremental distortion from state i−r−1 to state i, plus the entropy rate associated with the run-size pair (r,s) scaled by λ. When the cost for the iteration has been computed in either step 176 or step 180, the cost to state i calculation is complete.

Figure 12:
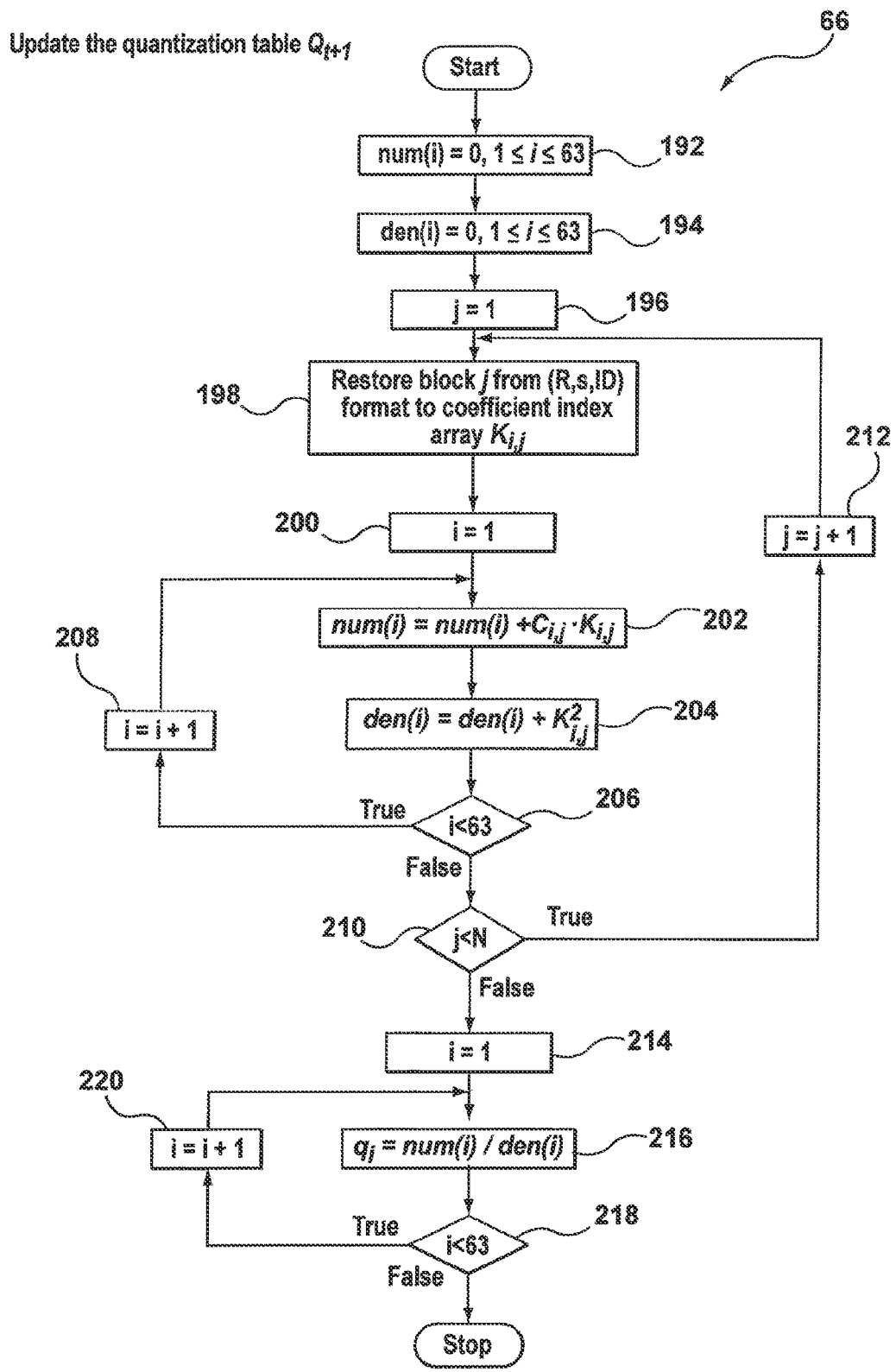
FIG. 12, in a flowchart, illustrates a process for updating a quantization table invoked by the process of FIG. 7.

Referring now to the flowchart of FIG. 12, the process for updating the quantization table $Q_{t+1}$, step 66 of the flowchart of FIG. 7, is described in detail. In step 192, a numerator array, num(i) is initialized to 0 for $1 \leq i \leq 63$. Similarly, in step 194, a denominator array, den(i) is also initialized to 0 for $1 \leq i \leq 63$. In step 196, the block index j is initialized to 1. At step 198, block j is restored from its run-size and indices format to create coefficient index array $K_{i,j}$. At step 200, index i, representing the position in the zig-zag order of the $j^{th}$ block is set to 1.

In step 202, the $i^{th}$ value in the numerator array is computed as the sum of its current value and the product of the original $i^{th}$ DCT coefficient of the $j^{th}$ block and the restored DCT index at the $i^{th}$ position in the zig-zag order of the $j^{th}$ block, as determined in step 198, from the run-size and indices format. In step 204, the $i^{th}$ value in the denominator array is computed as the sum of its current value and the square of the DCT index at the $i^{th}$ position in the zig-zag order of the $j^{th}$ block.

Query 206 asks whether i is less than 63. Where I<63, i is incremented at step 208 and the numerator and denominator values associated with the new i are computed. Where i is not less than 63 in query 206, query 210 asks whether j is less than N, the total number of blocks. If j<N, j is incremented in step 212 and the numerator and denominator computations are performed based on the next block. Otherwise step 214 sets i equal to 1.

In step 216, the value associated with the $i^{th}$ position in the zig-zag order of quantization table $Q_{t+1}$, $q_i$, is computed as the value of the numerator over the denominator at position i. Query 218 asks whether i is less than 63. Where this is true, i is incremented at step 220 and the remaining positions in the quantization table are computed. Otherwise, the updating of $Q_{t+1}$ is complete.

Figure 13:
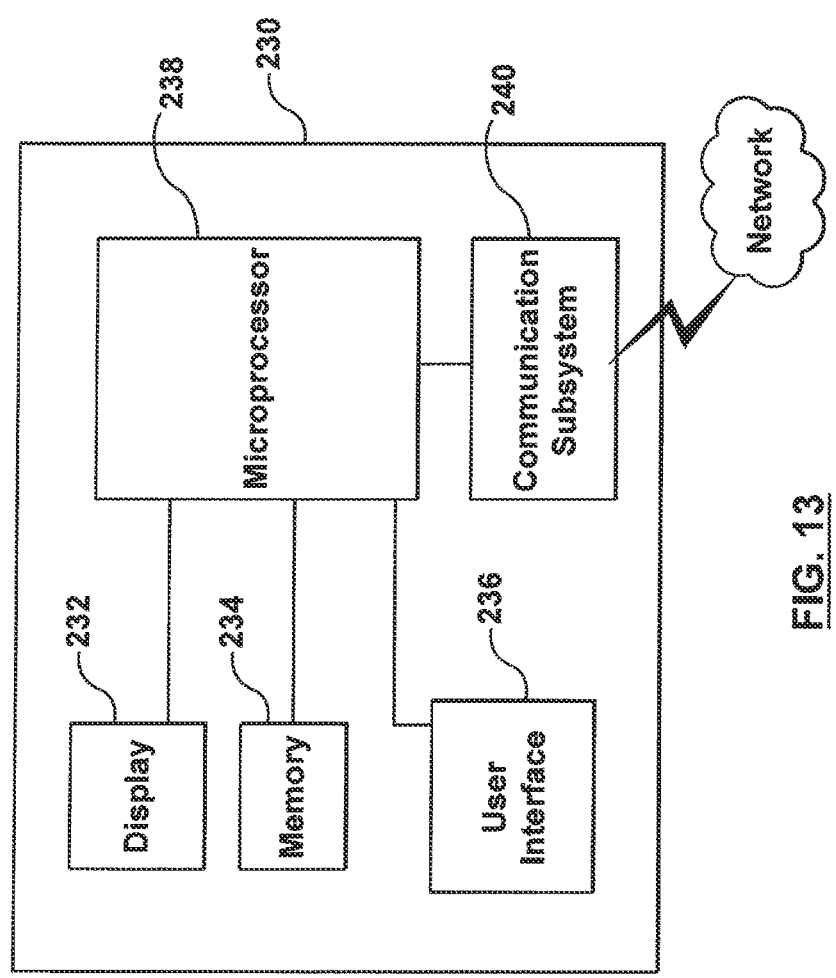
FIG. 13, in a block diagram, illustrates a data processing system in accordance with an aspect of the present invention.

Referring to FIG. 13, there is illustrated in a block diagram a data processing system 230 for implementing compression methods such as those described above in connection with FIGS. 7-12 in accordance with an exemplary embodiment of the invention. As shown, the system 230 comprises a display 232 for displaying, for example, images to be transmitted. Similarly, the memory 234 may include JPEG or MPEG files to be transmitted. On receiving instructions from a user via a user interface 236, a microprocessor 238 compresses the input image data in the manner described above using a calculation module and initialization module (not shown), before providing the compressed data to a communication subsystem 240. The communication subsystem 240 may then transmit this compressed data to network 242.

As described above, the system 240 may be incorporated into a digital camera or cell phone, while the mode of transmission from communication subsystem 240 to network 242 may be wireless or over a phone line, as well as by higher band width connection.

Perceptual Weighting

The method and system described heretofore treats all quantization error equivalently. In particular, the AC coefficient optimization using graph-based run-length coding, as illustrated in FIG. 3, and described in connection with equations (13) and (14), is based on a cost expression that measures the absolute value of the difference between an AC coefficient, $C_i$, and its quantized value, $q_i \cdot K_i$, where $q_i$ is a quantization coefficient corresponding to the AC coefficient, and $K_i$ is a quantization index.

It will be appreciated that many default quantization matrices do not have a uniform step size. In particular, the quantization step size is generally larger at higher frequencies/values than at lower frequencies/values. The increase in steps sizes may be linear or non-linear. This non-uniformity in quantization step size is typically intentional because humans are more sensitive to distortions at the lower frequencies, so fidelity at those frequencies is more valuable or important than at higher frequencies. In other words, a distortion of a certain magnitude at a low frequency is more perceptible or noticeable than a distortion of an equivalent magnitude at a higher frequency.

The variations in the quantization step sizes mean that a quantization error in higher frequency components will appear to have a larger magnitude than a quantization error in a lower frequency component. Accordingly, the cost functions may be unnecessarily sensitive to this large quantization error at high frequencies. This large quantization error at a high frequency may represent acceptable distortion from a perception point of view. Conversely, an equivalently large quantization error at a lower frequency may represent unacceptable distortion from a perception point of view.

Accordingly, in accordance with an aspect of the present application, a perceptual weighting factor $w_i$ is defined for use within the cost functions to generally give greater weight to distortion at lower frequencies in the evaluation of overall cost than is given to distortion at higher frequencies. Since quantization step size roughly increases with increasing frequency, the perceptual weighting factor $w_i$ may be used to give greater weight to distortion that occurs as a result of quantization error at the smaller quantization step sizes than quantization error that occurs at the larger quantization step sizes. In one sense, the perceptual weighting factor $w_i$ attempts to partly or wholly compensate or counter-balance the non-uniformity in quantization step sizes for the purpose of assessing quantization error in the cost function.

In one embodiment, the perceptual weighting factor $w_i$ may be based on a default quantization table. For example, the perceptual weighting factor $w_i$ may be defined as:

$$w_i = \frac{qd_{min}}{qd_i} \quad (19)$$

where $qd_{min}$ is the smallest quantization coefficient in the default quantization table, and $qd_i$ is the quantization coefficient corresponding to $C_i$ in the default quantization table. Using this expression, the larger the quantization steps size, the lower the perceptual weighting factor $w_i$.

In another embodiment, for slight improvement at the expense of slightly increased complexity, the perceptual weighting factor $w_i$ may be made image dependent by using the expression:

$$w_i = \frac{q_{min}}{q_i} \quad (20)$$

where $q_{min} = \min\{q_1, q_2, \ldots q_{63}\}$ and $q_i$ is the quantization coefficient corresponding to $C_i$ for the current iteration of the method.

As noted above, the perceptual weighting factor $w_i$ is intended for use in cost expressions based on quantization error. In particular, the perceptual weighting factor may be used in determining the cost due to distortion in the quantization of the AC coefficients for a run-size pair. For example, equation (13) may be modified to have the form:

$$\sum_{j=i-r}^{i-1} w_j^2 C_j^2 + w_i^2 |C_i - q_i \cdot K_i|^2 + \lambda \cdot (-\log_2 P(r, s) + s) \quad (21)$$

Similarly, equation (14), which relates to the incremental cost due to distortion from transitioning from a state $i (i \leq 62)$ to the end state, may be take the form:

$$\sum_{j=i+1}^{63} w_j^2 C_j^2 + \lambda \cdot (-\log_2 P(0, 0)) \quad (22)$$

Other variations and modifications of the invention are possible. Further, while the aspects of the invention described above have relied on (run, size) pairs and (run, level) pairs, it will be appreciated by those of skill in the art that other (run, index derivative) pairs could be used by deriving index-based values other than size or level from the coefficient indices. All such and similar modifications or variations are believed to be within the sphere and scope of the invention as defined by the claims appended hereto.

The invention claimed is:

1. A method of encoding transform domain coefficients for encoding an image, the method comprising:
iteratively,
quantizing the transform domain coefficients to generate quantized transform domain coefficients using quantization step sizes, and
entropy encoding the quantized transform domain coefficients using entropy encoding parameters,
wherein the quantization step sizes and the encoding parameters are selected to minimize a rate-distortion cost function,
until an incremental improvement in the cost is less than a threshold value,
and wherein the rate-distortion cost function includes a perceptual weighting factor applied to a quantization error, the perceptual weighting factor adjusting the rate-distortion cost function to apply greater weight to quantization error occurring in coefficients quantized by smaller quantization step sizes than to quantization error occurring at coefficients quantized by larger quantization step sizes.

2. The method claimed in claim 1, wherein the perceptual weighting factor compensates for non-uniformity in the quantization step sizes within the rate-distortion cost function.

3. The method claimed in claim 1, wherein the perceptual weighting factor is based on a ratio of a minimum quantization step size to a quantization step size used for a particular iteration.

4. The method claimed in claim 3, wherein the quantization steps sizes are defined by a default quantization table, and wherein the perceptual weighting factor is given by the expression $$w_i = \frac{qd_{min}}{qd_i}$$

wherein $qd_{min}$ is the smallest quantization step size in the default quantization table, and $qd_i$ is the $i^{th}$ quantization step size in the default quantization table.

5. The method claimed in claim 1, wherein the encoding parameters comprise run-size pairs, and wherein the rate-distortion cost function includes an expression of cost attributable to quantization error relating to a particular run-size pair over a run r, expressed as $$\sum_{j=i-r}^{i-1} w_j^2 C_j^2 + w_i^2 |C_i - q_i \cdot K_i|^2$$

wherein index i represents a current state within 64 possible states, index j represents a previous state prior to the run r, $C_i$ is the AC coefficient for the current state, $q_i$ is a quantization coefficient corresponding to $C_i$, $K_i$ is a quantization index corresponding to $C_i$, and w is the perceptual weighting factor corresponding to the like-indexed AC coefficient.

6. The method claimed in claim 1, wherein the encoding parameters comprises run-level coding parameters to encode the quantized transform domain coefficients in a variable-length entropy encoding process.

7. The method claimed in claim 1, wherein the encoding parameters comprise run-index pairs to encode the quantized transform domain coefficients in a variable-length entropy encoding process.

8. A system for encoding transform domain coefficients for encoding an image, the system comprising:

memory;
a processor; and
an encoding application that, when executed, configures the processor to:
iteratively,
quantize the transform domain coefficients to generate quantized transform domain coefficients using quantization step sizes, and
entropy encode the quantized transform domain coefficients using entropy encoding parameters,
wherein the quantization step sizes and the encoding parameters are selected to minimize a rate-distortion cost function,
until an incremental improvement in the cost is less than a threshold value,
and wherein the rate-distortion cost function includes a perceptual weighting factor applied to a quantization error, the perceptual weighting factor adjusting the rate-distortion cost function to apply greater weight to quantization error occurring in coefficients quantized by smaller quantization step sizes than to quantization error occurring at coefficients quantized by larger quantization step sizes.

9. The system claimed in claim 8, wherein the perceptual weighting factor compensates for non-uniformity in the quantization step sizes within the rate-distortion cost function.

10. The system claimed in claim 8, wherein the perceptual weighting factor is based on a ratio of a minimum quantization step size to a quantization step size used for a particular iteration.

11. The system claimed in claim 10, wherein the quantization steps sizes are defined by a default quantization table, and wherein the perceptual weighting factor is given by the expression $$w_i = \frac{qd_{min}}{qd_i}$$

wherein $qd_{min}$ is the smallest quantization step size in the default quantization table, and $qd_i$ is the $i^{th}$ quantization step size in the default quantization table.

12. The system claimed in claim 8, wherein the encoding parameters comprise run-size pairs, and wherein the rate-distortion cost function includes an expression of cost attributable to quantization error relating to a particular run-size pair over a run r, expressed as $$\sum_{j=i-r}^{i-1} w_j^2 C_j^2 + w_i^2 |C_i - q_i \cdot K_i|^2$$

wherein index i represents a current state within 64 possible states, index j represents a previous state prior to the run r, $C_i$ is the AC coefficient for the current state, $q_i$ is a quantization coefficient corresponding to $C_i$, $K_i$ is a quantization index corresponding to $C_i$, and w is the perceptual weighting factor corresponding to the like-indexed AC coefficient.

13. The system claimed in claim 8, wherein the encoding parameters comprises run-level coding parameters to encode the quantized transform domain coefficients in a variable-length entropy encoding process.

14. The system claimed in claim 8, wherein the encoding parameters comprise run-index pairs to encode the quantized transform domain coefficients in a variable-length entropy encoding process.

15. A non-transitory computer-readable medium storing computer-readable instructions for encoding transform domain coefficients for encoding an image, the computer-readable instructions comprising:
instructions for iteratively,
quantizing the transform domain coefficients to generate quantized transform domain coefficients using quantization step sizes, and
entropy encoding the quantized transform domain coefficients using entropy encoding parameters,
wherein the quantization step sizes and the encoding parameters are selected to minimize a rate-distortion cost function,
until an incremental improvement in the cost is less than a threshold value,
and wherein the rate-distortion cost function includes a perceptual weighting factor applied to a quantization error, the perceptual weighting factor adjusting the rate-distortion cost function to apply greater weight to quantization error occurring in coefficients quantized by smaller quantization step sizes than to quantization error occurring at coefficients quantized by larger quantization step sizes.

16. The non-transitory computer-readable medium claimed in claim 15, wherein the perceptual weighting factor compensates for non-uniformity in the quantization step sizes within the rate-distortion cost function.

17. The non-transitory computer-readable medium claimed in claim 15, wherein the perceptual weighting factor is based on a ratio of a minimum quantization step size to a quantization step size used for a particular iteration.

18. The non-transitory computer-readable medium claimed in claim 17, wherein the quantization steps sizes are defined by a default quantization table, and wherein the perceptual weighting factor is given by the expression $$w_i = \frac{qd_{min}}{qd_i}$$

wherein $qd_{min}$ is the smallest quantization step size in the default quantization table, and $qd_i$ is the $i^{th}$ quantization step size in the default quantization table.

19. The non-transitory computer-readable medium claimed in claim 15, wherein the encoding parameters comprise run-size pairs, and wherein the rate-distortion cost function includes an expression of cost attributable to quantization error relating to a particular run-size pair over a run r, expressed as $$\sum_{j=i-r}^{i-1} w_j^2 C_j^2 + w_i^2 |C_i - q_i \cdot K_i|^2$$

wherein index i represents a current state within 64 possible states, index j represents a previous state prior to the run r, $C_i$ is the AC coefficient for the current state, $q_i$ is a quantization coefficient corresponding to $C_i$, $K_i$ is a quantization index corresponding to $C_i$, and w is the perceptual weighting factor corresponding to the like-indexed AC coefficient.

20. The non-transitory computer-readable medium claimed in claim 15, wherein the encoding parameters comprise run-level coding parameters to encode the quantized transform domain coefficients in a variable-length entropy encoding process.

* * * * *